United States Patent
Travers et al.

(10) Patent No.: US 8,944,384 B2
(45) Date of Patent: Feb. 3, 2015

(54) REFUELLING EQUIPMENT AND METHOD FOR REFUELLING AN AIRCRAFT TANK SYSTEM

(75) Inventors: Nicolas Travers, St Just Malmont (FR); Antoine Veyrat-Masson, Saint-Etienne (FR)

(73) Assignee: Zodiac Aerotechnics, Plaisir (FR)

( * ) Notice: Subject to any disclaimer, the term of this patent is extended or adjusted under 35 U.S.C. 154(b) by 92 days.

(21) Appl. No.: 13/700,458

(22) PCT Filed: Jun. 1, 2010

(86) PCT No.: PCT/EP2010/057666
§ 371 (c)(1),
(2), (4) Date: Feb. 4, 2013

(87) PCT Pub. No.: WO2011/150967
PCT Pub. Date: Dec. 8, 2011

(65) Prior Publication Data
US 2013/0126676 A1    May 23, 2013

(51) Int. Cl.
*B64D 37/16* (2006.01)

(52) U.S. Cl.
CPC ...................................... *B64D 37/16* (2013.01)
USPC .................................. 244/135 A; 137/487.5

(58) Field of Classification Search
CPC ......... B64D 37/00; B64D 37/14; B64D 37/16
USPC .......... 244/135 A, 135 R; 137/265, 266, 389, 137/487.5
See application file for complete search history.

(56) References Cited

U.S. PATENT DOCUMENTS

| | | | | |
|---|---|---|---|---|
| 3,825,027 A | * | 7/1974 | Henderson | 137/265 |
| 4,550,747 A | * | 11/1985 | Woodworth et al. | 137/487.5 |
| 4,591,115 A | * | 5/1986 | DeCarlo | 244/135 C |
| 4,932,609 A | | 6/1990 | Secchiaroli et al. | |
| 6,089,252 A | * | 7/2000 | Braun | 137/263 |
| 2007/0084511 A1 | | 4/2007 | Johnson et al. | |
| 2008/0173762 A1 | | 7/2008 | Crowley | |
| 2009/0032645 A1 | | 2/2009 | Cutler et al. | |

FOREIGN PATENT DOCUMENTS

WO      2011150966 A1    12/2011

OTHER PUBLICATIONS

International Search Report dated Jun. 30, 2011 in Application No. PCT/EP2010/057666.

* cited by examiner

*Primary Examiner* — Philip J Bonzell
*Assistant Examiner* — Nicholas McFall
(74) *Attorney, Agent, or Firm* — Kilpatrick Townsend & Stockton LLP; Dean W. Russell, Esq.; Kristin M. Crall, Esq.

(57) ABSTRACT

The aircraft refuelling equipment (20) of an aircraft comprises a pipework (22) in which a fuel supply line (13) is connected to a plurality of tank supply lines, fuel tanks connected to tank supply lines of the pipework, first valves (24, 25, 26) allowing each fuel tank to be disconnected from the fuel supply line, and at least one captor (30) that provides a signal indicative of a pressure or a flow rate. For each of said first valves, a first valve flow parameter can be estimated, using said captor. The equipment further comprises:—at least one actuator associated with each of said first valves, the actuator allowing adjustment of the opening of the associated first valve; and an electronic control unit (ECU) connected to the respective actuator-first valve assemblies and adapted to regulate an opening of the first ECU valves, using respective first valve flow parameter data.

23 Claims, 4 Drawing Sheets

REFUELLING EQUIPMENT AND METHOD FOR REFUELLING AN AIRCRAFT TANK SYSTEM

CROSS REFERENCE TO RELATED APPLICATION

This application is the U.S. national phase of International Application No. PCT/EP2010/057666 filed on Jun. 1, 2010, and published in English on Dec. 8, 2011 as International Publication No. WO2011/150967 A1, the contents of which are incorporated herein by reference.

FIELD OF THE INVENTION

The present invention relates generally to the refuelling of aircrafts. It relates more particularly to refuelling equipment on board an aircraft, particularly but not necessarily exclusively, an aircraft having onboard refuelling equipment comprising fuel valves. The invention also relates to a method for refuelling an aircraft.

BACKGROUND OF THE INVENTION

Conventional refuelling systems onboard aircrafts comprise fuel flow restrictors that are sized according to a maximum fuel pressure of about 55 psig. This may correspond to a maximal rate of 7 m/s for the refuelling pipework of the aircraft. Since the actual supply pressure is typically significantly less than that maximum, refuelling times are extended as the flow rates are unnecessarily restricted by the fuel flow restrictors.

The document US2008/0173762 A1 discloses an aircraft refuelling system allowing the refuelling rates to be increased, in which fuel flow restrictors are mounted in the refuelling pipework of the aircraft and restrict the flow rate of fuel from the refuelling pipework into the fuel tanks. Fuel valves are also provided to allow each tank to be disconnected from the refuelling pipework. A general regulation is performed by a fuel pressure regulator on board the aircraft so as to define the maximum pressure in the refuelling pipework.

However, a refuelling system having such a type of general regulation is not adapted when there is a need to more refuelling a specific fuel tank. The onboard fuel circuit of an aircraft thus cannot be always optimized according to the concrete needs.

Therefore, a need exists to improve the way of refuelling the respective fuel tanks of an aircraft.

SUMMARY OF THE INVENTION

Embodiments of the present invention provide an aircraft refuelling equipment for an aircraft, the equipment comprising:
- a pipework comprising a fuel supply line connected to a plurality of tank supply lines;
- fuel tanks connected to tank supply lines of the pipework and adapted to be refuelled trough the fuel supply line;
- first valves arranged in said pipework and adapted to allow each fuel tank to be disconnected from the fuel supply line;
- at least one captor allowing, for each of said first valves, a first valve flow parameter to be estimated, said at least one captor being arranged within the pipework for providing at least one signal indicative of a pressure or a flow rate; and characterized in that it further comprises:
- at least one actuator associated with each of said first valves in a respective actuator-first valve assembly and allowing adjustment of the opening of the associated first valve;
- an electronic control unit connected to the respective actuator-first valve assemblies and adapted to regulate an opening of the first valves, using respective first valve flow parameter data. Accordingly, each of the first valves defines a flow control valve. With such an arrangement, an optimization of the refuelling times of the fuel tanks may be obtained. With a regulation of the open position (with a determined opening ratio) of the first valves, it is advantageously permitted to control in reel time the distribution of the flow rates. Such a dynamic control may prevent perturbation which may occur at the end of the refuelling. In particular, the refuelling of the wing tanks for commercial airplanes may be efficiently performed with a balanced repartition of the fuel.

Furthermore, the regulation of the respective openings allows minimizing influence of the eventual temperature fluctuations (that modify the fuel density).

According to a specific feature, the refuelling equipment further comprises at least one gauging device associated with at least one of said fuel tanks, and preferably with each of the fuels tanks, for measuring a fuel level and for providing at least one signal indicative of the measured fuel level for the corresponding fuel tank, wherein the electronic control unit is adapted to regulate said opening, using first valve flow parameter data and fuel level data. Accordingly, optimization of the refuelling rate is performed for one or more of the fuel tanks, and preferably for each of the fuel tanks, by taking into account the respective initial amounts of fuel.

One object of the present invention is also to provide a method adapted for refuelling a fuel tank system.

Accordingly, it is further proposed according to the invention a method of refuelling a fuel tank system that comprises a fuel supply line, a pipework, fuel tanks and first valves adapted to allow each fuel tank to be disconnected from the fuel supply line, the method comprising:
- supplying fuel to the pipework via said fuel supply line with a determined flow rate;
- distributing the determined flow rate between the fuels tanks; and
- estimating a first valve flow parameter for each of said first valves, by using at least one captor adapted to provide at least one signal indicative of a pressure or a flow rate;

characterized in that it further comprises the steps of:
- adjusting opening of the respective first valves by associated actuators, so as to perform the distribution of said determined flow rate; and
- regulating an opening of the respective first valves by an electronic control unit forming part of the aircraft tank system, using first valve flow parameter data.

According to a specific feature, the method further comprises:
- programming a desired amount of fuel for each of the fuel tanks to be refuelled;
- measuring, for each of the fuel tanks to be refuelled, a fuel level and providing a signal indicative of the fuel level in the fuel tank by at least one gauging device; and
- regulating said opening by the electronic control unit, using first valve flow parameter data and fuel level data.

Optionally, the method comprises:
- for at least one of the fuel tanks to be refuelled, processing the signal indicative of the fuel level in the fuel tank and the signal indicative of the pressure within the pipework, by said electronic control unit, and producing at least one refuelling parameter allowing to determine for said fuel tank the time remaining to complete the refuelling; and controlling said actuators by the electronic control unit so as to increase a ratio of distribution in one of the fuel tanks that requires the longest time for the refuelling, in response to at least one control signal from the electronic control unit.

According to a specific feature, the method further comprises gradually disconnecting a fuel tank from the fuel supply line so as to anticipate the end of refuelling for the fuel tank to be disconnected, in response to at least one interrupt control signal from the electronic control unit, the interrupt control signal being generated after a comparison between the refuelling parameter and a threshold.

According to another feature, one of the first valves, which is associated with the fuel tank that requires the greatest amount of fuel, is adjusted with an initial opening that can be increased, and wherein a control signal adapted to increase said initial opening is generated by the electronic control as soon as it has been determined that at least one of the following conditions exists for another one of the fuel tanks:

the time remaining to complete the refuelling is less than a predetermined period that is preferably, in a non limitative manner, not superior to 60 seconds;

the remaining fuel amount to be injected in the fuel tank is less than a predetermined value that is preferably, in a non limitative manner, not superior to 1t.

Other features and advantages of the invention will become apparent to those skilled in the art during the description which will follow, given by way of a non-limiting example, with reference to the appended drawings.

DETAILED DESCRIPTION OF EMBODIMENTS

In the various figures, the same references are used to designate identical or similar elements.

Figure 1:
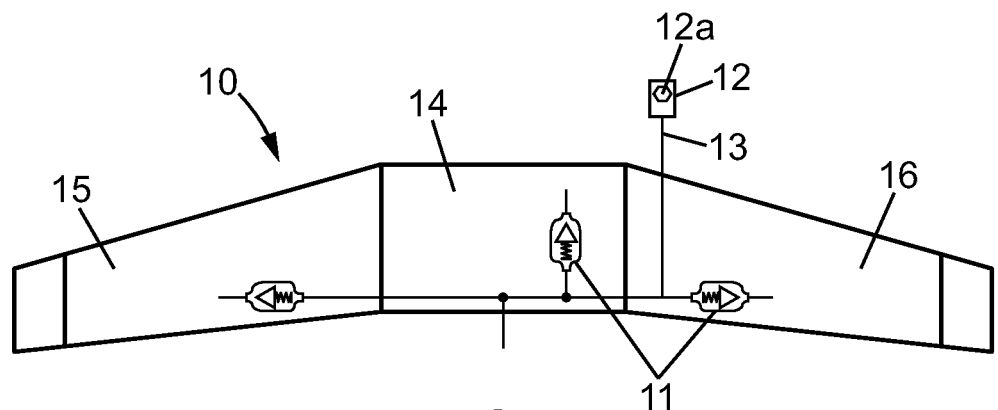
FIG. 1 shows a conventional aircraft refuelling system.

FIG. 1 is a schematic diagram of an aircraft refuelling system 10 conventionally used for refuelling of commercial airplanes such as A320. This aircraft refuelling system 10 is provided with solenoid valves 11 in a wye connection with a refuel coupling 12 that defines a fuel supply inlet 12a for the fuel supply line 13. In this example, the centre tank 14 has a capacity of 8250 liters and each of the wing tanks 15, 16 has a capacity of 6925 liters (inner the fuel tank). Optional fuel tanks, for example at least one Additional Center Tank ACT may also be provided (not shown).

Figure 2:
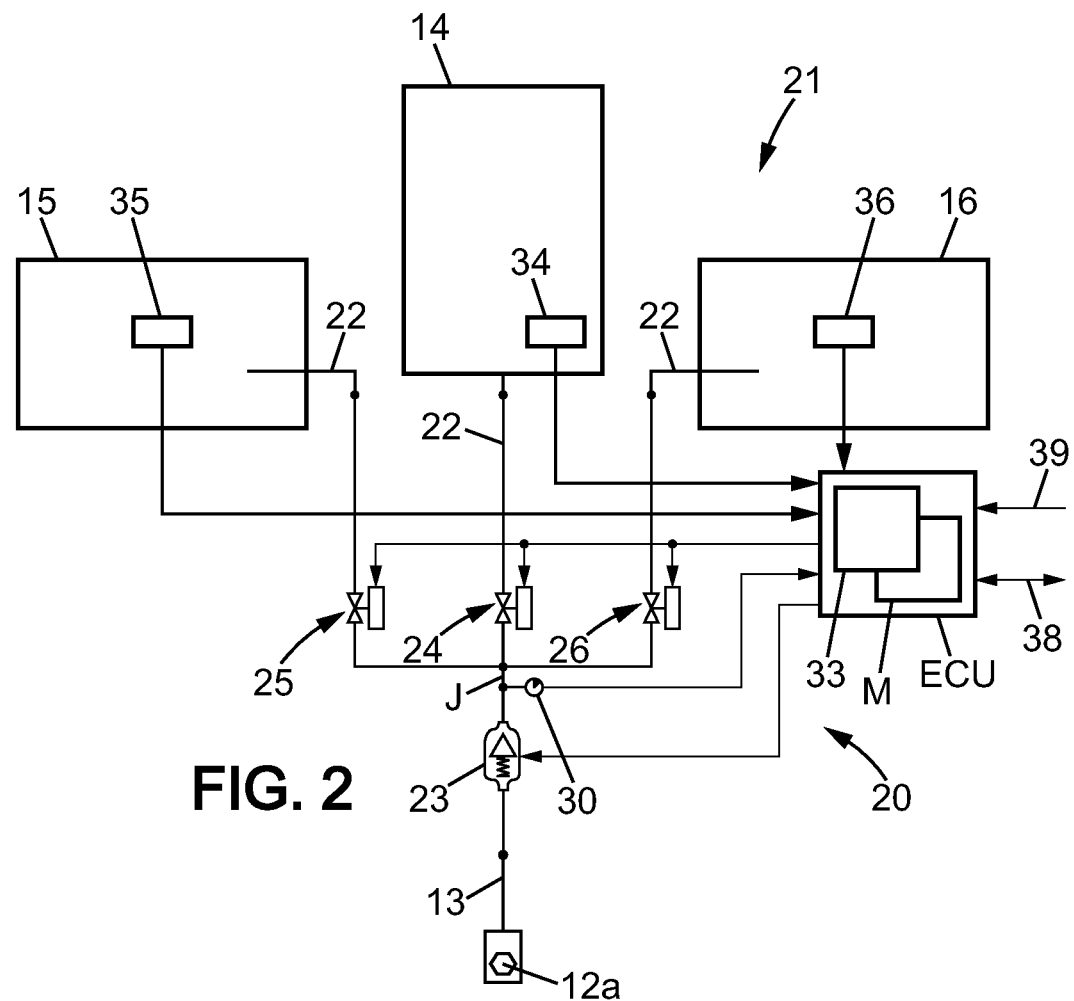
FIG. 2 shows schematically an aircraft refuelling equipment according to a first embodiment of the present invention.
Figure 3:
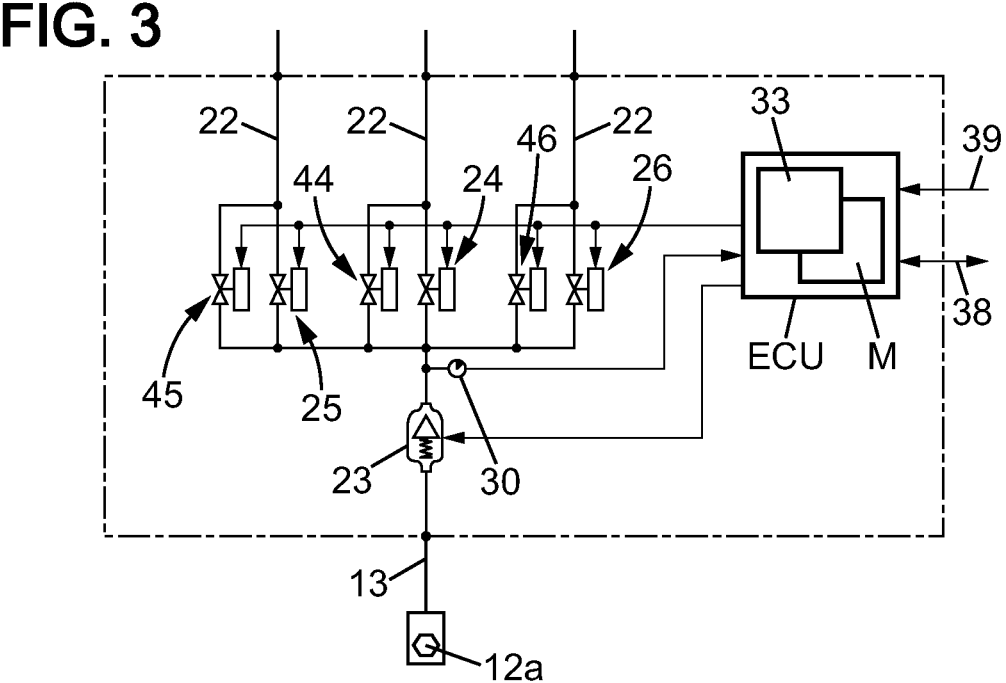
FIG. 3 shows schematically an aircraft refuelling equipment according to a second embodiment of the present invention.
Figure 4:
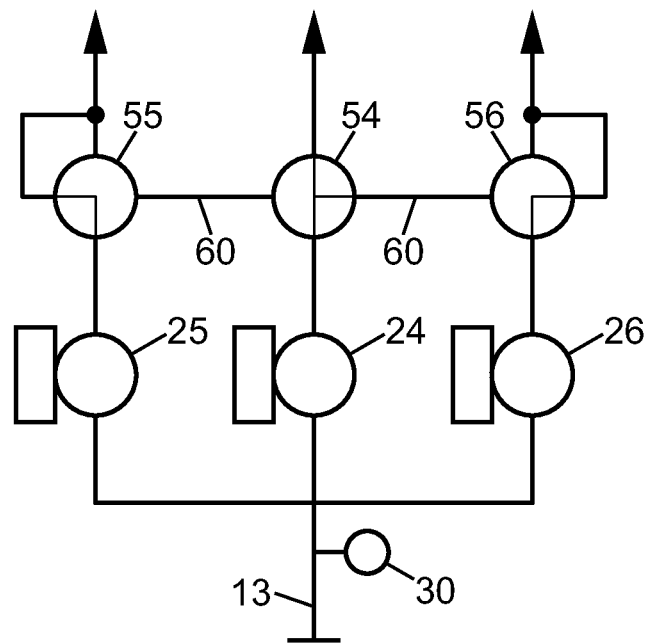
FIG. 4 shows an arrangement of valves in accordance with a second embodiment of the present invention.

As shown in FIGS. 2-4, embodiments of the invention provide equipment 20 for dynamically refuelling the aircraft tank system 21, in order to minimize refuelling times. Such equipment 20 may be properly used for a plane having a plurality of fuel tanks, for instance three fuel tanks 14, 15, 16 as in the example of FIG. 1.

In the first embodiment illustrated in FIG. 2, the equipment 20 comprises a fuel supply line 13, three tank supply lines and three fuel tanks 14, 15, 16. The refuelling pipework, hereafter called pipework 22, has respective pipes connected to each of the fuel tanks 14, 15, 16. A wye connection is formed trough a junction J of the pipework 22. Here one valve, for instance a solenoid valve 23, is arranged between the fuel supply inlet 13 and the junction J, so as to function as a master valve with respect to a plurality of controllable valves 24, 25, 26. In this first embodiment, the valve 24 is connected to the fuel tank 14, the valve 25 is connected to the fuel tank 15, and the valve 26 is connected to the fuel tank 16. Accordingly, each of these valves 24, 25, 26 allows each fuel tank to be disconnected from the fuel supply line 13 such that fuel can be directed as required. Of course any alternative number of fuel tanks could be used and the solenoid valve 23, which is directly connected to the fuel supply line 13, could be replaced by any suitable actionable valve. Also, such a master valve may be provided with a pushing button or similar hand actuated element, in order to allow the master valve to be open by an operator.

Still referring to FIG. 2, one or more captors 30 are provided to transmit a physical parameter indicative of flow conditions within the pipework 22. Here the captor 30 is a pressure sensor placed between the junction J and the solenoid valve 23 or any similar master valve directly connected to the fuel supply line 13. In the embodiment shown in FIG. 2, the pressure sensor or similar captor 30 is in connection with an electronic control unit ECU. This captor 30 allows, in combination with the respective valve-actuator assemblies also connected to the electronic control unit ECU, a regulation of the respective refuelling flow rates to be performed. The captor 30 could be also replaced by one or more flow meters adequately arranged in the pipework 22 and each providing signals indicative of a flow rate.

In the non limitative example illustrated in FIG. 2, data about the pressure sensed by the captor 30 within the pipework 22 and data about the opening of the first valves 24, 25, 26 are retrieved by a receiving module M of the electronic control unit. This module M is configured to estimate the respective first valve flow parameters, using the pressure data and the position data.

Figure 6A:
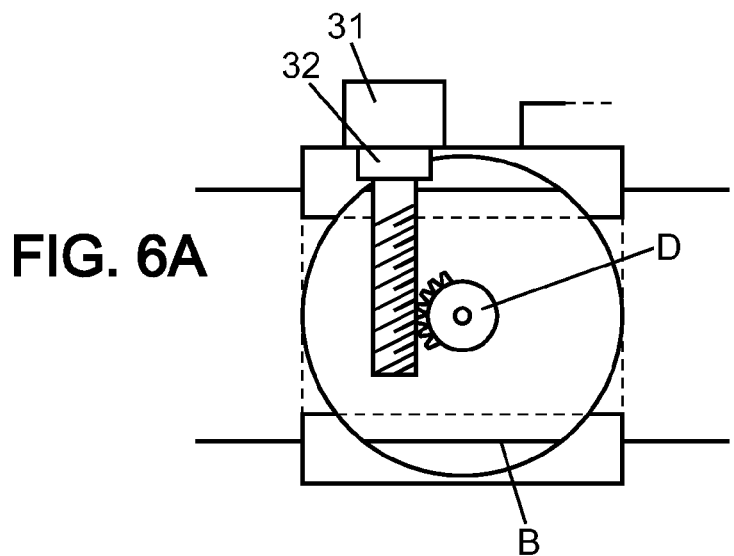
FIG. 6A and 6B show respective views of a ball valve adapted to be used as a flow control valve of the aircraft refuelling equipment in accordance with the first embodiment of the invention.
Figure 6B:
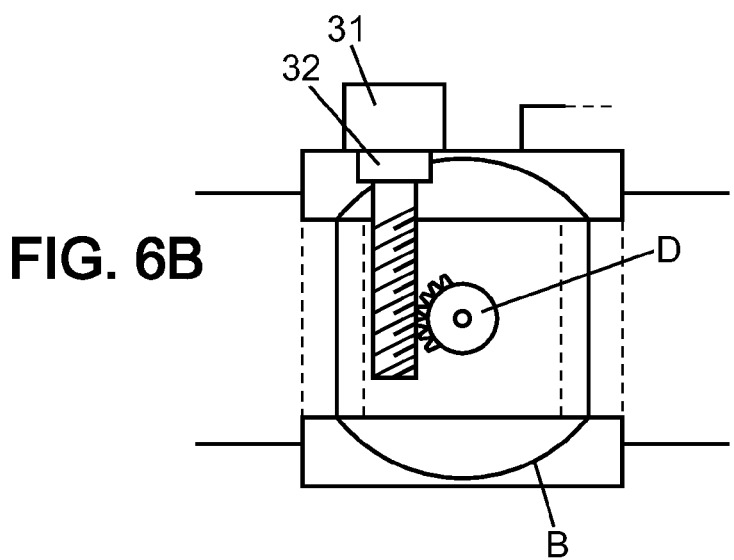

Each of the valves 24, 25, 26 may be fitted with actuators and positioners to define a flow control valve regulating the fuel flow. Referring to FIG. 6A and 6B which schematically illustrate a non-limitative example for the flow control valve architecture, the valve body B may be a ball rotated by a conventional positioner (not shown) driven by a servomotor 31 or similar servo-unit. Here, a position sensor 32 provides a signal indicative of the position of the valve body B. When the motor element of the servomotor 31 is of the rotating type, the position sensor 32 may sense the angular position of the valve body B or another element connected to the valve body B. The opening of the valves 24, 25, 26 may be selectively adjusted at a defined open position between the full open position as shown in FIG. 6A and the closed position as shown in FIG. 6B. As a result, the flow rate may be adjusted between the two valve ports of the ball valve. The actuator allows adjusting in reel time the opening of the corresponding first valve. The angular position of the rotating drive D may precisely define the opening ratio of the valve body B. The valve actuator may be of the type as described in the co-pending application PCT/EP2010/057656.

While a straight through ball-valve, having a quick response and long life, is here represented, it is understood that the first valves 24, 25, 26 are not necessarily ball-valves or similar quarter turn valves. More generally, the valves 24, 25, 26 each comprise a valve body with a plurality of adjustable positions between the full open position and the closed position, in order to allow the flow or pressure regulation of the fuel or similar fluid to be stored in the respective fuel tanks 14, 15, 16.

Positioners (typically called smart positioners) or similar driving elements of the valves 24, 25, 26 are controlled as a function of signals generated by the captor 30. The control of the position of the respective valve bodies may take into account flow parameter data and fuel level data as well. Here, the fuel level data may be obtained by measuring, for each of the fuel tanks 14, 15, 16 to be refuelled, a fuel level. One and preferably a plurality of gauging devices 34, 35, 36 may be associated with each of the fuel tanks 14, 15, 16 to provide a signal indicative of the measured fuel level to the electronic control unit ECU. During the refuelling operation, the electronic control unit is processing the signals of the captor 30 and the gauging devices 34, 35, 36 to dynamically regulate the opening of the respective first valves 24, 25, 26. Signals of the captor 30 or any similar captors are thus converted into first valve flow parameter data, while signals of the gauging devices 34, 35, 36 are converted into fuel level data. These data or any similar data retrieved by the electronic control unit ECU are used to determine the individual needs in the respective fuel tanks 24, 25, 26.

Figure 5:
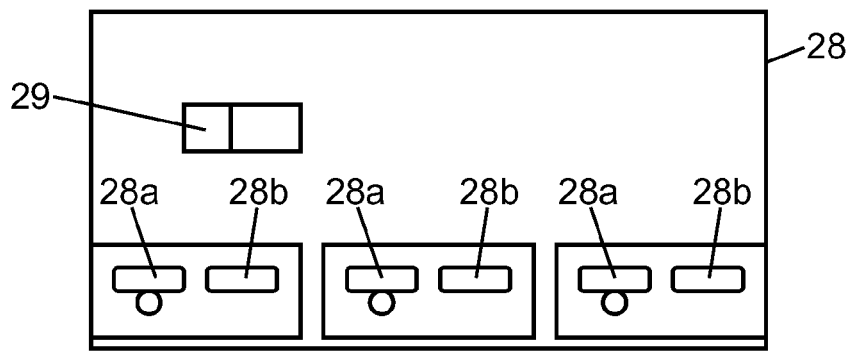
FIG. 5 shows schematically a part of refuel interface displaying desired and actual amounts of fuel

Referring to FIG. 5, data of the desired amount of fuel for each of the fuels tanks may be displayed by a specific refuelling panel 28 and/or by a navigation screen. These data are input in a known manner when a refuel mode is selected by the operator. The selector 29 enables such a mode to be selected, allowing the refuel operation to be programmed. The corresponding interface, which may be a conventional interface, comprises first display areas 28a for indicating the programmed amount of fuel in the respective fuel tanks 14, 15, 16 and second display areas 28b for indicating the amount of fuel measured in the respective duel tanks 14, 15, 16. The electronic control unit ECU is connected to this kind of refuelling panel 28 and may advantageously take into account the input data indicative of the desired amount of fuel for each of the fuels tank 14, 15, 16.

In one non limitative exemplary embodiment, the electronic control unit ECU shown in FIG. 2 allows the signal of said captor, the signal of the gauging devices, and additional input data such as data indicative of the desired amounts of fuel to be processed, in order to estimate the time remaining to complete the refuelling of the corresponding fuel tank. The electronic control unit ECU may comprise an algorithm using information resulting from processing of said signals and input data to produce refuelling parameters. For example, the refuelling parameters are each indicative of the needs for refuelling in one of the fuel tanks 14, 15, 16. As the time remaining to complete the refuelling of the corresponding fuel tanks 14, 15, 16 may be calculated with such refuelling parameters, the algorithm may be further adapted to determine an optimized repartition of the flow rates.

Referring to FIG. 2, the electronic control unit ECU here comprises a control module 33 adapted to generate, as a function of the refuelling parameters, a plurality of control signals each adapted to control the actuator of one of said first valves 24, 25, 26. These control signals are produced according to the optimized repartition determined by the algorithm. Of course such an optimization depends on the specific configuration of the aircraft. The control module 33 may be adapted to generate at least one interrupt control signal, if a comparison of a refuelling parameter with a threshold is indicative of an imminent end of the refuelling in one of the fuel tanks 14, 15, 16. The actuator actuates, in response to the interrupt control signal, the associated first valve for gradually disconnecting the concerned fuel tank from the fuel supply line 13.

In a usual case where the total flow rate (here the flow rate passing trough the solenoid valve 23) is constant, the flow rates of the fuel tanks 14, 15, 16 may be similar at the beginning of the refuelling and individually adjusted through different opening ratios at the first valves 24, 25, 26 when the gauging devices 14, 15, 16 indicate that at least a first one of the fuel tanks 24, 25, 26 is refuelled at a level close to the desired level.

For instance, refuelling of the wing tanks 15, 16 may be completed in a first step. As soon as the fuel level of one wing tank 15 of the wing tanks 15, 16 is at a predetermined level close to the desired level, the opening of the corresponding first valve 25 may be smoothly decreased at a lower opening ratio. In an exemplary non limitative embodiment, the predetermined level may correspond to the level, for which the time remaining to complete the refuelling is less than 30 or 60 seconds (based on calculation at the electronic control unit ECU, with a constant flow rate before the decrease of the first valve opening). Other appropriate threshold values may be used to initiate the decrease of the first valve opening just before the refuelling end for the wing tank 15.

While the first valve 25 is progressively closed with respective increments in the opening ratio, at least one of the other valves 24, 26 is actuated through the associated actuator, so as to refuel at a higher speed at least one of the other fuel tanks 14, 16, in a second step. In other words, the flow rate may be automatically redistributed, in order to accelerate the refuelling. For example, only the flow rate associated to the centre tank 14 may be increased when one of the wing tanks 15, 16 is at the desired amount of fuel or does not require as much fuel as in the other fuel tanks. Optionally, each actuator of the first valves 24, 25, 26 allows a gradual disconnection to be performed within a short predetermined period, preferably not inferior to 10 seconds: for example 30 seconds.

It is understood that the opening of the first valves 24, 25, 26 may be controlled in different manners so as to optimize the refuelling time and is not limited to the above indicated example. For example, only the wing tanks 15, 16 may be refuelled in a first stage, start of refuel of the centre tank 14 being performed in a second stage. More generally, any automatic intelligent control may be used to minimize the refuelling time.

Referring to FIG. 2, the electronic control unit ECU may provide signals for controlling the solenoid valve 23 and the actuators of the first valves 24, 25, 26 through conventional control lines and may communicate with a central computer or similar terminal via at least one bus 38. A plurality of refuelling options may be available and the operator can select the desired option with the terminal when selecting the desired amounts of fuel in the respective fuel tanks 14, 15, 16. A connection 39 with a power source (not shown) is also provided for supplying the electronic control unit ECU with a low voltage. Optionally, an additional electronic control unit or any suitable controller may be provided to allow the refuelling even in case of failure or breakdown in the electronic control unit ECU.

Figure 7:
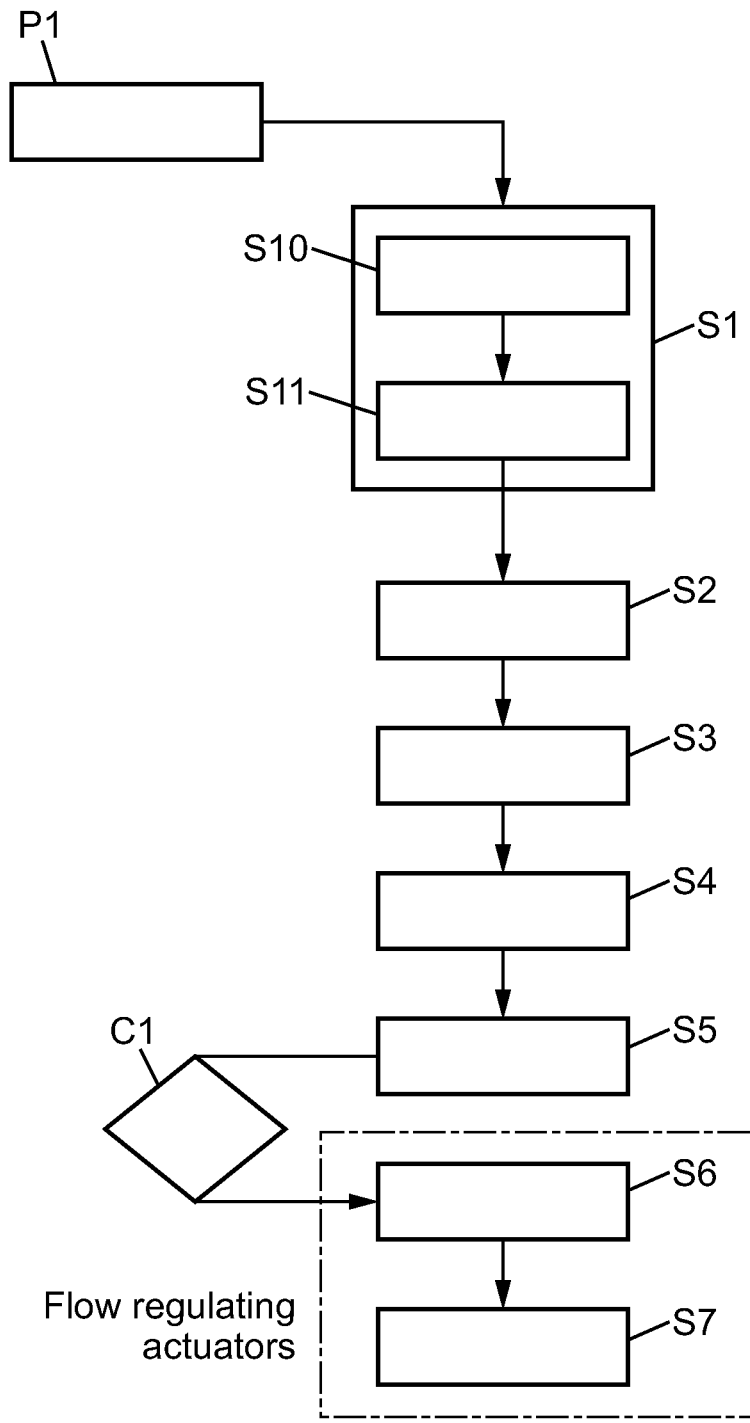
FIG. 7 is a diagram illustrating a method comprising several steps implemented in the invention for controlling the refuelling.

Referring to FIGS. 2 and 7, the method for refuelling the aircraft tank system 21 provided with a plurality of fuel tanks 14, 15, 16 may be started by programming at a step P1 the desired amounts of fuel. Then, the electronic central unit ECU initiates the refuelling by supplying S1 fuel to the pipework 22 with a determined flow rate. This supply is performed by activating opening S10 of the solenoid valve 23 or any similar master valve, and the plurality of first valves 24, 25, 26 are actuated to adequately distribute S11 the determined flow rate, between the fuels tanks 14, 15, 16. Optionally, a calculation of the respective flow rates associated to the fuel tanks 14, 15, 16 is initially performed by the electronic control unit ECU, using data indicative of the initial amount of fuel in each of the fuels tanks 14, 15, 16 and data indicative of the desired amounts of fuel. Initial control signals from the electronic control unit ECU allow the actuators to proportionally open the respective first valves 24, 25, 26 in accordance with said calculation.

The module M of the electronic central unit ECU, in connexion with the captor 30 and the actuators of the first valves 24, 25 ,26 then estimates S2 a first valve flow parameter for each of said first valves 24, 25, 26. A measuring step S3, may be performed by the gauging devices 34, 35, 36 at the same time as, before or after the estimation S3, in order to determine the respective fuel levels.

After a collect by the electronic central unit ECU of first valve flow parameter data and fuel level data, the following steps may be performed, the algorithm may be used. A processing S4 of said data is thus performed to estimate in reel time the flow rates and the relative needs for refuelling (remaining fuel amounts). The algorithm is adapted to produce S5 refuelling parameters allowing determining for each of the fuel tanks 14, 15, the time remaining to complete the refuelling. Alternatively, any parameter indicative of the adequacy of respective flow rates and the associated need for refuelling may be calculated. After that, the algorithm may compare the relative needs so as to establish a hierarchy of the fuel tanks 14, 15, 16. If the comparison C1 determines that one of the flow rates at one of the first valves 24, 25, 26 should be modified, the configuration of the actuators has to be changed. In other words, a regulation of the opening may be concretely obtained, with the need for changing the configuration of the actuators determined during the comparison C1.

Accordingly, as illustrated in FIG. 7, the electronic control unit ECU sends a control signal which is received S6 by the actuators of the first valves 24, 25, 26. The active control of the flow regulation per fuel tank is then performed at the control step S7. The opening of at least one of the first valves 24, 25, 26 is adjusted as a function of the variation of the need for a higher flow rate. Thanks to this control, a ratio of distribution is increased in the one of the fuel tanks 14, 15, 16 that requires the longest time for the refuelling.

The comparison S1 may also be performed to initiate a gradual disconnection of one of the fuel tanks 14, 15, 16 from the fuel supply line 13 so as to anticipate the end of refuelling for the fuel tank to be disconnected. For instance, a comparison is made between the refuelling parameter and a threshold indicative that the fuel tank is close to its desired level. In a non limitative manner, indicia or thresholds for initiating a progressive closure may be indicative of a calculated time remaining to complete the refuelling that is less than a predetermined period or indicative of a remaining fuel amount to be injected in the fuel tank that is less than a predetermined value.

Several advantages are obtained when anticipating the end of refuelling of the fuels tanks 14, 15, 16:
as the flow rate is important, waves are generated in the fuel tanks 14, 15, 16, this phenomenon causing difficulties to read the reel amount of fuel;
the final amount may also be very close from the desired amount, while with conventional refuelling systems as illustrated in FIG. 1, the flow rate cannot be exactly predicted when closing the solenoid valve 11.

The refuelling equipment 20 as illustrated in FIG. 2 allows the refuelling to be achieved in a smooth manner and the refuelling time may be reduced trough the opening control exerted by the electronic control unit ECU, as a function of the needs in the respective fuel tanks 24, 25, 26. This refuelling equipment 20 may be implemented as a "refuel heart" in an aircraft or of any suitable configuration. The first valves 24, 25, 26 may be close to the solenoid valve to minimize length of the ducts connected to the junction J. Furthermore, the refueling equipment 20 may be associated with more than three fuel tanks 15, 15, 16. Two ACT (not shown) may be refueled by using additional ducts and additional first valves. Bypasses or the like may be also used. The first valves 24, 25, 26 may also be associated with by-pass means to obtain a fault tolerant architecture. One or more of the fuel tanks 14, 15, 16 may be also supplied with fuel by one of said first valves 24, 25, 26 which is provided with two distinct actuators. When a failure occurs that prevents a valve body B to be displaced into an open position, such by-pass means or secondary actuators may be automatically used. Specific captors may provide signals indicative of such a failure to the electronic control unit ECU.

A second embodiment is illustrated with reference to FIG. 3, showing a control of the flow rates directed to the respective fuels tanks 14, 15, 16 as in FIG. 2 by use of first control valves 24, 25, 26. In this second embodiment, second valves 44, 45, 46 are respectively provided, in parallel, for enabling refuelling of the fuel tanks 14, 15, 16, in case of failure to open the first valve. The second valves 44, 45, 46 may be each provided with a conventional two-position actuator, while the first valves 24, 25, 26 may be considered as smart valves. Alternatively, at least one of the second valves 44, 45, 46 may be commanded by a specific actuator receiving control signals from the central control unit ECU.

Optionally, the refuelling may be performed with the second valves 44, 45, 46 configured at the open state, in parallel with the first valves 24, 25, 26 that are also actively used. In such an option, size of the different valves may be advantageously reduced because the flow rate for each of the fuel tanks 14, 15, 16 is distributed via two valves 24,44; 25,45; 26,46.

A third embodiment is illustrated with reference to FIG. 4, in which the master valve is optionally removed and selector valves 54, 55, 56 having two or three positions are connected between the first valves 24, 25, 26 and the respective fuel tanks 14, 15, 16. The captor 30 may be situated at the start of the fuel supply line 13. The fuel tank system 21 is similar to that described in FIG. 2 but is here fault tolerant because:
when a failure occurs at one of the first valves 24, 25, 26 and causes this first valve to be blocked in the closed position, an adjustment of selector valves positions may provide a bypass, in order to avoid any refuelling interrupt; and
the selector valves 54, 55, 56 may stop the refuelling for one of the fuel tanks 14, 15, 16 when the associated one of the first valves 24, 25, 26 is blocked in an open position.

Here, the selector valves 54, 55, 56 are four-position valves that are controlled by the electronic control unit ECU. Of course the number of selector valves 54, 55, 56 may be different, depending on the configuration of the fuel tank system 21. A default position which is an open position of the selector valves 54, 55, 56 may be selected so that a normal refuelling is permitted if a failure occurs for one of the selector valves 54, 55, 56. For the first valve 24, a bypass pipe including a pipe 60 joining two of the selector valves 54, 55, is provided between the selector valve 54 connected to the centre tank 14 and a second of the first valve 25, 26. For bypassing this first valve 24, the selector valve 54 may commute into a position where the centre tank 14 receives fuel coming from one of the two other selector valves 55, 56. Each of the two other first valves 25, 26 may be similarly bypassed.

At least one pipe 60 and at least one of the first valves 25, 26 may also be used to accelerate the refuel of the centre tank 14. This particular refuel mode is optional and may be activated by the operator.

In one variant, the pipework 22 is arranged for distributing the flow rate supplied by the fuel supply line 13 between a number N1 of fuels tanks 14, 15, 16, by using an inferior or equal number N2 (N2≤N1) of first valves 24, 25, 26 arranged in a wye connection with respect to the fuel supply line 13. The number of first valves 24, 25, 26 may be reduced by using one or more multi-way control valves directly connected to the fuel tanks 14, 15, 16. For example, the first valve 25 shown in FIG. 4 could be removed and the fuel tank 15 is refuelled in this case by using the two selector valves 54, 55 and the in-between pipe 60. Alternatively, the number of first valves 24, 25, 26 may be maintained and the number of fuel tanks 14, 15, 16 increased, for example to include ACT tanks.

Referring to FIGS. 2-4, the average distance between the fuel supply line 13 and the respective first valves 24, 25, 26 and the average distance between the electronic central unit ECU and the fuel supply line 13 are preferably much inferior to the average distance between the respective first valves 24, 25, 26 and the corresponding fuel tanks 14, 15, 16. With such an optional configuration, the implementation of the aircraft refuelling equipment 20 may be done with a minimal modification of the conventional pipework.

The present invention has been described in connection with the preferred embodiments. These embodiments, however, are merely for example and the invention is not restricted thereto. It will be understood by those skilled in the art that other variations and modifications can easily be made within the scope of the invention as defined by the appended claims, thus it is only intended that the present invention be limited by the following claims.

In certain embodiments, the refuelling pipework 22 referred to in the description above of the embodiment of the invention may also be utilised to supply fuel from the fuel tanks 14, 15, 16 to the engines of the aircraft, or to transfer fuel from one fuel tank to another fuel tank. Furthermore, it is understood that the refuelling parameters may be used as well to determine the remaining fuel amount to be injected in the fuel tank. It is also obvious that the first valves 24, 25, 26 may be actuated for defuelling operation.

In the context of the present invention the term "fuel" should not be interpreted in a way to be restricted to typical aircraft fuels, like e.g. kerosine. Instead the term "fuel" in the sense of the present invention should also include substitute fluids, which preferably have a flash point>100° C.

Any reference sign in the following claims should not be construed as limiting the claim. It will be obvious that the use of the verb "to comprise" and its conjugations does not exclude the presence of any other elements besides those defined in any claim. The word "a" or "an" preceding an element does not exclude the presence of a plurality of such elements.

The invention claimed is:

1. An aircraft refuelling equipment for an aircraft, the equipment comprising:
   a pipework comprising a fuel supply line connected to a plurality of tank supply lines;
   fuel tanks connected to tank supply lines of the pipework and adapted to be refuelled through the fuel supply line);
   first valves arranged in said pipework and adapted to allow each fuel tank to be disconnected from the fuel supply line;
   at least one captor allowing, for each of said first valves, a first valve flow parameter to be estimated, said at least one captor being arranged within the pipework for providing at least one signal indicative of a pressure or a flow rate, said at least one captor comprising at least one pressure captor for sensing a pressure within the pipework and for providing at least one signal indicative of a pressure;
wherein each first valve comprises a valve body with a plurality of adjustable positions between a full open position and a closed position,
wherein the equipment further comprises:
   at least one actuator associated with each of said first valves in a respective actuator-first valve assembly and allowing adjustment of an opening of the associated first valve at a defined position of the valve body chosen among the full open position, the closed position and the plurality of adjustable positions therebetween;
   an electronic control unit (ECU) connected to the respective actuator-first valve assemblies, the electronic control unit comprising:
a receiving module for receiving position data from said first valves and for estimating the respective first valve flow parameters, using the pressure data and the position data, and a control module adapted to regulate the opening of the first valves, using respective first valve flow parameter data.

2. The equipment according to claim 1, further comprising at least one gauging device associated with at least one of said fuel tanks for measuring a fuel level and for providing at least one signal indicative of the measured fuel level for the corresponding fuel tank, wherein the electronic control unit (ECU) is adapted to regulate said opening, using first valve flow parameter data and fuel level data.

3. The equipment according to claim 2, wherein the electronic control unit (ECU) is adapted to process the signal of said captor and the signal of said gauging device as well as input data indicative of the desired amount of fuel for each of the fuels tanks, and comprises:
   an algorithm using information resulting from processing of said signals and input data to produce a refuelling parameter allowing to determine the time remaining to complete the refuelling of the corresponding fuel tank; and
   a control module adapted to generate, as a function of the refuelling parameters, a plurality of control signals each adapted to control said actuator of one of said first valves.

4. The equipment according to claim 3, wherein the control module of the electronic control unit (ECU) is adapted to generate at least one interrupt control signal, if a comparison of a refuelling parameter with a threshold is indicative of an imminent end of the refuelling in a fuel tank, the corresponding actuator being arranged to actuate the associated first valve for gradually disconnecting said fuel tank from the fuel supply line, in response to said interrupt control signal.

5. The equipment according to claim 4, wherein said corresponding actuator is adapted to allow the gradual disconnection to be performed during a period of not less than to 10 seconds.

6. The equipment according to claim 4, wherein said corresponding actuator is adapted to allow the gradual disconnection to be performed during a period not less than a predetermined period.

7. The equipment according to claim 1, wherein each of said first valves is a ball valve provided with an actuator adapted for adjusting in real time the opening of the first valve.

8. The equipment according to claim 1, comprising at least one additional valve directly connected to the fuel supply line and supplying fuel to the pipework via said fuel supply line.

9. The equipment according to claim 1, wherein at least one of said fuel tanks is connected on the one hand to one of said first valves actuated by said actuator and on the other hand to a second valve.

10. The equipment according to claim 9, wherein the second valve is actuated by a specific actuator adapted to be controlled by the electronic control unit.

11. The equipment according to claim 1, wherein at least one of said fuel tanks is adapted to be supplied with fuel via one of said first valves which is provided with two distinct actuators.

12. The equipment according to claim 1, comprising a selector valve arranged between one of the fuel tanks and a first one of said first valves, wherein a bypass pipe is provided between said selector valve and a second one of said first valves, the selector valve being arranged to select at least one of a plurality of positions, one of which allows said first one of said first valves to be bypassed.

13. The equipment according to claim 1, wherein the pipework is arranged for distributing the flow rate supplied by the fuel supply line between a number N1 of fuels tanks, by using a number N2 of first valves arranged in a wye connection with respect to the fuel supply line, wherein N1≥N2, and using at least one multi-way control valve directly connected to a plurality of the fuel tanks.

14. A method for refuelling an aircraft tank system that comprises a fuel supply line, a pipework, fuel tanks and first valves adapted to allow each fuel tank to be disconnected from the fuel supply line, the method comprising:
supplying fuel to the pipework via said fuel supply line with a determined flow rate;
distributing the determined flow rate between the fuels tanks; and
estimating a first valve flow parameter for each of said first valves, by using at least one captor adapted to provide at least one signal indicative of a pressure or a flow rate, said at least one captor comprising at least one pressure captor for sensing a pressure within the pipework and for providing at least one signal indicative of a pressure;
wherein the method further comprises:
adjusting opening of the respective first valves by associated actuators, so as to perform the distribution of said determined flow rate, each first valve comprising a valve body with a plurality of adjustable positions between a full open position and a closed position, the opening of the valve being adjusted at a defined position of the valve body chosen among the full open position, the closed position and the plurality of adjustable positions therebetween;
receiving position data from said first valves and estimating the respective first valve flow parameters, by a receiving module of an electronic control unit forming part of the aircraft tank system, using the pressure data and the position data; and
regulating the opening of the respective first valves by a control module of the electronic control unit using first valve flow parameter data.

15. The method according to claim 14, further comprising:
programming a desired amount of fuel for each of the fuel tanks to be refuelled;
measuring, for each of the fuel tanks to be refuelled, a fuel level and providing a signal indicative of the fuel level in the fuel tank by at least one gauging device; and
regulating said opening by the electronic control unit (ECU), using first valve flow parameter data and fuel level data.

16. The method according to claim 15, further comprising:
for at least one of the fuel tanks to be refuelled, processing the signal indicative of the fuel level in the fuel tank and the signal indicative of the pressure within the pipework, by said electronic control unit (ECU), and producing at least one refuelling parameter allowing to determine for said fuel tank the time remaining to complete the refuelling; and
controlling said actuators by the electronic control unit (ECU) so as to increase a ratio of distribution in one of the fuel tanks that requires the longest time for the refuelling, in response to at least one control signal from the electronic control unit (ECU).

17. The method according to claim 16, further comprising gradually disconnecting a fuel tank from the fuel supply line so as to anticipate the end of refuelling for the fuel tank to be disconnected, in response to at least one interrupt control signal from the electronic control unit (ECU), the interrupt control signal being generated after a comparison between the refuelling parameter and a threshold.

18. The method according to claim 14, wherein one of the first valves, which is associated with the fuel tank that requires the greatest amount of fuel, is adjusted with an initial opening that can be increased, and wherein a control signal adapted to increase said initial opening is generated by the electronic control as soon as it has been determined that at least one of the following conditions exists for another one of the fuel tanks:
the time remaining to complete the refuelling is less than a predetermined value;
the remaining fuel amount to be injected in the fuel tank is less than a predetermined value.

19. The method according to claim 18, wherein the time remaining to complete the refuelling is less than about 60 seconds.

20. The method according to claim 18, wherein the remaining fuel amount to be injected in the fuel tank is less than about 1 tonne.

21. A method for refuelling an aircraft tank system that comprises a fuel supply line, a pipework, fuel tanks and first valves adapted to allow each fuel tank to be disconnected from the fuel supply line, the method comprising:
supplying fuel to the pipework via said fuel supply line with a determined flow rate;
distributing the determined flow rate between the fuels tanks; and
estimating a first valve flow parameter for each of said first valves, by using at least one captor adapted to provide at least one signal indicative of a pressure or a flow rate;

adjusting opening of the respective first valves by associated actuators, so as to perform the distribution of said determined flow rate;

regulating an opening of the respective first valves by an electronic control unit forming part of the aircraft tank system, using first valve flow parameter data;

programming a desired amount of fuel for each of the fuel tanks to be refuelled;

measuring, for each of the fuel tanks to be refuelled, a fuel level and providing a signal indicative of the fuel level in the fuel tank by at least one gauging device;

regulating said opening by the electronic control unit (ECU), using first valve flow parameter data and fuel level data;

for at least one of the fuel tanks to be refuelled, processing the signal indicative of the fuel level in the fuel tank and the signal indicative of the pressure within the pipework, by said electronic control unit (ECU), and producing at least one refuelling parameter allowing to determine for said fuel tank the time remaining to complete the refuelling; and controlling said actuators by the electronic control unit (ECU) so as to increase a ratio of distribution in one of the fuel tanks that requires the longest time for the refuelling, in response to at least one control signal from the electronic control unit (ECU).

22. The method according to claim 21, further comprising gradually disconnecting a fuel tank from the fuel supply line so as to anticipate the end of refuelling for the fuel tank to be disconnected, in response to at least one interrupt control signal from the electronic control unit (ECU), the interrupt control signal being generated after a comparison between the refuelling parameter and a threshold.

23. A method for refuelling an aircraft tank system that comprises a fuel supply line, a pipework, fuel tanks and first valves adapted to allow each fuel tank to be disconnected from the fuel supply line, the method comprising:

supplying fuel to the pipework via said fuel supply line with a determined flow rate;

distributing the determined flow rate between the fuels tanks; and estimating a first valve flow parameter for each of said first valves, by using at least one captor adapted to provide at least one signal indicative of a pressure or a flow rate;

adjusting opening of the respective first valves by associated actuators, so as to perform the distribution of said determined flow rate;

regulating an opening of the respective first valves by an electronic control unit forming part of the aircraft tank system, using first valve flow parameter data;

wherein one of the first valves, which is associated with the fuel tank that requires the greatest amount of fuel, is adjusted with an initial opening that can be increased, and wherein a control signal adapted to increase said initial opening is generated by the electronic control as soon as it has been determined that at least one of the following conditions exists for another one of the fuel tanks:

the time remaining to complete the refuelling is less than about 60 seconds, the remaining fuel amount to be injected in the fuel tank is less than about 1 tonne.

* * * * *